United States Patent [19]

Esposito

[11] 4,262,656
[45] Apr. 21, 1981

[54] SOLAR CLIMATE CONTROL FOR GREENHOUSES

[76] Inventor: Chris Esposito, 2059 E. 37th St., Brooklyn, N.Y. 11234

[21] Appl. No.: 16,153

[22] Filed: Feb. 28, 1979

[51] Int. Cl.³ .................................................. F24J 3/02
[52] U.S. Cl. ........................................ 126/430; 47/17; 126/428
[58] Field of Search ............... 126/428, 429, 430, 450, 126/436, 417; 47/17, 18; 165/485; 34/93

[56] References Cited

U.S. PATENT DOCUMENTS

| | | | |
|---|---|---|---|
| 3,398,481 | 8/1968 | Lake | 47/17 X |
| 3,412,728 | 11/1968 | Thomason | 126/430 X |
| 3,925,928 | 12/1975 | Constantinescu et al. | 47/17 |
| 3,956,852 | 5/1976 | Ceausescu et al. | 47/17 |
| 4,045,880 | 9/1977 | Steffen | 126/431 |
| 4,069,593 | 1/1978 | Huang | 126/431 X |
| 4,103,825 | 8/1978 | Zornig | 126/429 |

Primary Examiner—James C. Yeung
Assistant Examiner—Larry Jones
Attorney, Agent, or Firm—Orville N. Greene

[57] ABSTRACT

A solar heat storage system is provided for greenhouses by providing the greenhouse with a gravel storage bed at the floor level, through which heated air from an air duct at the upper ridge of the greenhouse is circulated to take advantage of and store heat energy collected from the sun in the winter time. In the summer time the same system operates to maintain an even and relatively cool atmosphere within the greenhouse by disconnecting the air duct at the top, introducing fresh air from the outside and passing such air through humidifying means, thence through the gravel storage bed and out vents at the upper ridge of the greenhouse.

4 Claims, 6 Drawing Figures

SOLAR CLIMATE CONTROL FOR GREENHOUSES

This invention relates to a process and installation for the control of climate in a greenhouse wherein a substantial part of the energy for heating or cooling the greenhouse is obtained from the sun.

Among the objects of the invention is to provide a heating and cooling system for a greenhouse wherein the energy is largely derived from the sun.

Among other objects of the invention is to provide a solar heating installation for a greenhouse which takes up only a small proportion of the usable space within the greenhouse.

The objects of the invention are attained by providing an air circulating system wherein air heated by the sun is collected in an overhead duct in the upper region of the greenhouse and is distributed, as by means of a fan, through a heat-retaining ground level bed through perforated pipes. Means are provided for humidifying the heated air and adding carbon dioxide thereto during its movement. Means are also provided for admitting fresh air and for disconnecting the overhead duct. The greenhouse is provided with vents and louvers, some of which may be of the automatic type.

The invention accordingly consists in the features of construction, combination of elements and arrangements of parts, as will be exemplified in the structure to be hereinafter described and the scope of the application which will be indicated in the following claims:

The greenhouse is preferably constructed in a relatively high area with respect to the surroundings, where adequate drainage is no problem and which is as free of shade in the winter time as possible. It may take the form of a free standing structure as shown or be in the form of a lean-to wherein the wall of another building forms one side wall thereof.

Figure 1:
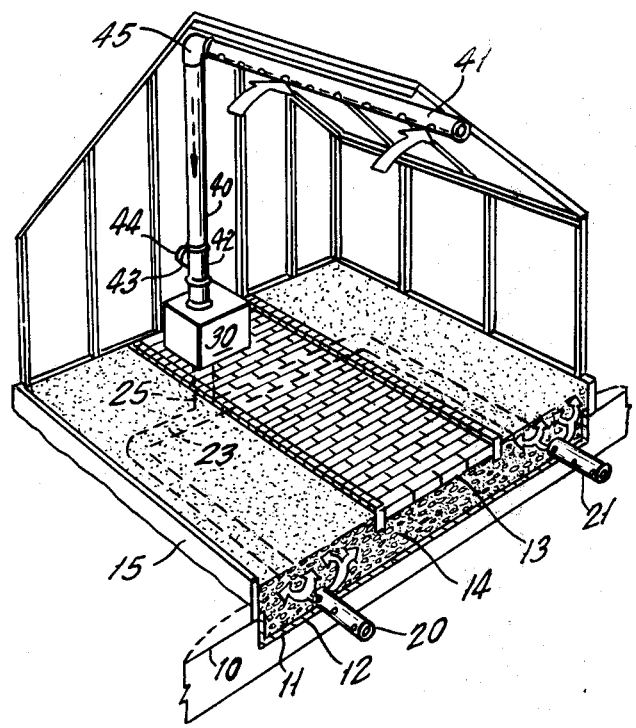
FIG. 1 is a perspective view, partially cut away, of a greenhouse equipped with the system of the invention.

To construct the system, as shown in FIG. 1 with the ground level at line 10, the ground is excavated to provide a level, solid, lower surface, 11 e.g., around 12-24 inches below ground level. The excavation is covered with a layer of insulation 12. Any type of insulation may be employed, but rigid formed polystyrene about 1 to 1½ inches thick has been found very satisfactory. If desired, e.g., if a center walk 13 has already been made, the excavation can be omitted under at least a portion of the center aisle 13.

Figure 2:
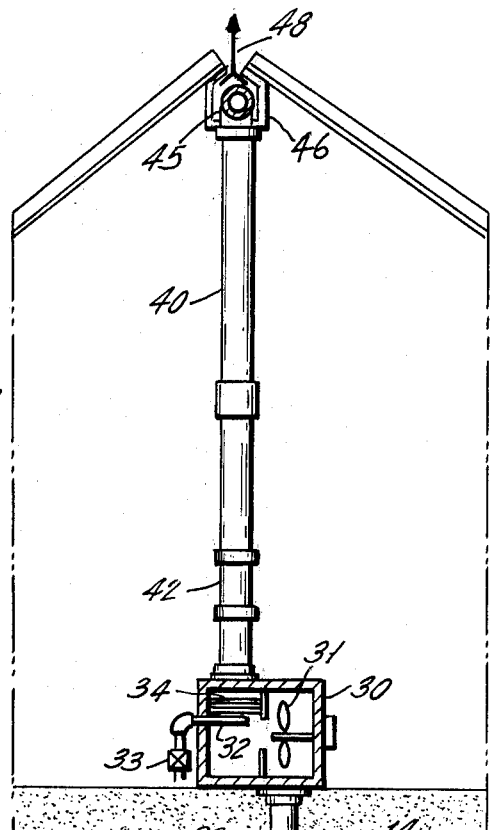
FIG. 2 is a cross sectional view of the system installed in a free standing greenhouse.

The underground air distribution pipes 20 and 21 are installed over the insulation 12. These pipes 20 and 21 contain a plurality of perforations, preferably on that part of the circumference which is not closed off by the insulation 12. These and other pipes throughout the installation may be of metal, but very satisfactory pipes have been made of polyvinyl chloride and similar plastic materials. The pipes 20 and 21 are connected together by cross-pipes 23, 24 which are also perforated and which are connected together by a Tee section 25 (see FIG. 2) with the upwardly extending flanged branch 26.

The excavated portion is thereafter covered with the heat storage particles to a depth of 18–24 inches. The heat storage particles may be any solid, stable, inorganic material such as gravel, broken bricks, broken concrete blocks, broken tiles, natural or crushed rocks or mixtures thereof, but substantially, all of said material should be at least about ¾" in diameter and up to the size of half-bricks or larger. The inorganic solid heat storage materials named above are very inexpensive or even waste materials, but it is obvious that, if desired, more expensive, specially formed pieces of a ceramic nature (e.g., such as Rashig rings), may be employed. As shown in FIG. 1, the gravel or heat storage layer within the greenhouse may be higher than, or on the same level with, the exterior soil. With gravel, all the pieces can be as small as about ¾" or preferably 1" in diameter. With gravel containing any substantial amount of pieces smaller than ¾", the flow of air therethrough will be retarded. Where crushed rock is used, all of the pieces should preferably be at least 1½" in diameter and the size should be as uniform as possible.

The foundation 15 can be of masonry or wood, e.g. redwood.

When the gravel layer is in place, the walk 13 can be constructed and an air control chamber 30 attached to the flanged extension 26. The air control chamber contains a centrifugal electric blower 31, a water feed pipe 32, which is equipped with a suitable valve 33, an evaporative pad humidifier 34 and preferably also a humidistat (not shown) which can be connected with suitable control apparatus (not shown) to operate the valve 33.

The system can be installed either after the greenhouse is erected or as the house is being built. After the greenhouse frame has been erected, the vertical duct 40 and overhead air duct 41 are installed.

Figure 3:
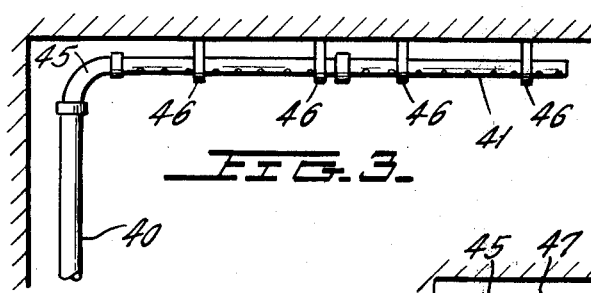
FIGS. 3 and 3a are detail views of the connections to the overhead pipe for winter and summer conditions, respectively.
Figure 3A:
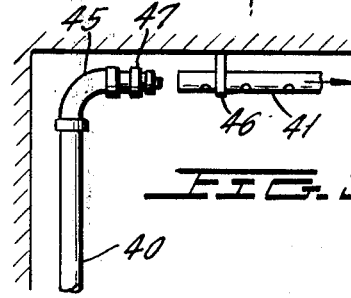

Just above the chamber 30, a T-member 42 is provided having an arm 43 extending outside the house and opening to the fresh air. The open end of this "T" may be closed by a suitable cap 44. The overhead duct 41 is attached to the frame by a series of loops, 46 e.g. of strap iron; it is connected to the vertical duct 40 by elbow member 45. As shown in FIG. 3A, for the summer weather, the overhead duct can be disconnected from the elbow 45 and a plug 47 inserted therein, and at the same time, the vent 48 of the greenhouse can be opened. Instead of disconnecting the overhead duct a valve can be provided between elbow 45 and duct 41.

Carbon dioxide can be added to the air by adding it either in liquid form to the water reservoir leading to the humidifier 32 or in solid form by placing it in the bottom of box 30 in the compartment below water feed pipe 32, the additional carbon dioxide aids in the photosynthesis process.

Figure 4:
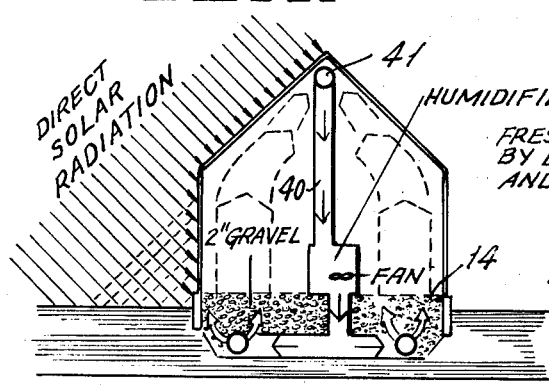
FIGS. 4 and 4a are diagrammatic views illustrating the circulation of the air during winter and summer connections, respectively.
Figure 4A:
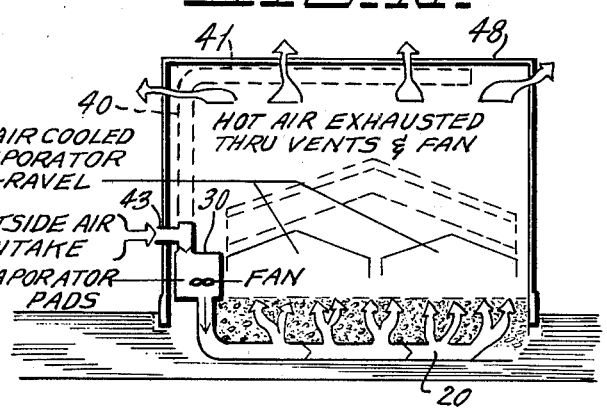

The operation of the system is illustrated in FIGS. 4 and 4A. For winter, as shown in FIG. 4A, the fresh air intake 43 is closed by plug 44 and the vent 48 is closed. Radiation from the sun heats the glass and the air and other objects inside the house. Heated air which tends to collect at the top of the house is sucked in through the orifice of the overhead duct 41 by fan 31 and blown through pipes 23, 24 to pass upwardly through the rock storage bed 14, whereupon heat is stored in said rock bed.

In the summer time, the overhead duct 41 is disconnected from elbow 45 and the plug 47 applied. At the same time, the plug 44 is removed from the fresh air vent 43, and the vent 48 is opened. The fan now sucks in fresh air, cools it by humidification and feeds the air through the rock storage bed, whereupon it is passed up and out of the vent 48. During spring and fall, the system is connected similarly to winter, but the vents 48 and the plug 44 may be opened, depending on the weather on a particular day.

Various louvers, not shown, may also be provided for the greenhouse structure.

Thus in winter, the solar radiation which passes through the glazing is converted to thermal heat and stores it in the storage bed 14. A typical 8' by 12' greenhouse can receive up to 35000 BUT's of direct solar radiation per hour. Even on a 0° F. winter day, this is enough to raise the greenhouse temperature to 90° F. Rather than exhaust this heat or let it dissipate through the roof, the structure of the invention stores such heat. A 2 ft. thick storage bed for an 8'×12' greenhouse is capable of holding up to 80000 BTU's of this free solar energy for use later on, this being enough to heat the greenhouse for 3–10 hours (depending on the heat loss characteristics of the greenhouse (i.e., single or double wall), the outside temperature and wind speed. Also plant diseases and pests thrive in a closed, stagnant atmosphere. Extremes in temperature variation and drafts are also harmful to plants. Air circulation as provided by applicant's fan and the passage through the storage bed is through, low in velocity and even in temperature. Fresh air introduced during the winter is first mixed with warmer greenhouse air in the air control chamber 30, humidified (if necessary), tempered by flowing through the rock storage bed and evenly distributed over the greenhouse floor area. With such a thorough and effective circulation system few plant diseases related problems should be encountered.

Normally about 60% of the heat in a greenhouse is lost through the roof, especially near the ridge where the warmest air accumulates. With this invention this heat is captured at the ridge in the overhead intake duct 41 and pumped to the lower and colder parts of the greenhouse where it is distributed. Under bench areas which are often damp and poorly heated in the customary greenhouse, are effectively warmed.

The summer time connections for cooling reduces overheating. Thus when the fresh air intake 43 is open and overhead pipe 41 disconnected, fresh cooler air is brought into the greenhouse at the floor level and working with the natural air flow forces the warmer air out through the roof vents 48. As the fresh air passes over the evaporator pads 34 the air is humidified and cooled and the storage bed 14 which cools down over night also cools the daytime air passed over it. Thus the circulating greenhouse air is constantly being conditioned by the gravel bed temperature. Air temperature fluctuations are diminished since the gravel bed 14 has sufficient mass and specific heat to retain or absorb heat for a substantial part of the day or night. High humidity levels are important in greenhouses and the air in the system is humidified when it is at a relatively high temperature and therefore most effectively humidified. When additional humidity is not desired the feed of water to the system can be cut off.

I claim:

1. A solar heating means for a greenhouse structure of the type having air vents and louvers comprising, an excavated area 12 to 24 inches deep, lined with insulating material and surrounded by a foundation for the greenhouse, at least one perforated pipe positioned on said insulating layer extending along an interior portion of said excavated area, a layer of stable inorganic heat storage particles of a size of at least $\frac{3}{4}$", covering said insulation and said pipe to a thickness of 18–24 inches, an air control chamber connected to said perforated pipe, said air control chamber, above said layer of heat storage particles, containing air propelling means, having inlet and outlet sides and humidifier means, means connecting the outlet side of said air propelling means to said perforated pipe, a T-section of pipe having one branch thereof forming an air vent extending to the outside of the greenhouse, a second branch connected to a vertical pipe, and a third branch connected to the inlet side of said air propelling means, means for optionally closing the air vent branch, an overhead perforated pipe extending along the upper interior region of said house, means connecting said overhead pipe to said vertical pipe, whereby for cold weather conditions, heated air warmed by the sun and reaching the upper regions of said house by convection is withdrawn by said air propelling means, passed to the perforated pipe below the heat storage particles, to pass upwardly and heat the heat storage particles.

2. The solar heating means as claimed in claim 1, comprising means to close said vertical pipe whereby, by opening the air vent, air from the outside may be passed through the humidifier and air propelling means to the heat storage layer to cool the same, said housing containing air vent means at the top thereof, permitting heated air to escape.

3. The solar heating means as claimed in claim 1, wherein said air control chamber is constructed to accommodate solid carbon dioxide for evaporating and mixing with the air passing through the chamber.

4. The solar heating means as claimed in claim 1, comprising means for introducing carbon dioxide to the humidifier means.

* * * * *

UNITED STATES PATENT OFFICE
CERTIFICATE OF CORRECTION

Patent No. 4,262,656    Dated Apr. 21, 1981

Inventor(s) CHRIS ESPOSITO

It is certified that error appears in the above-identified patent and that said Letters Patent are hereby corrected as shown below:

Column 1, line 52, insert a comma after the numeral "11"; cancel the comma before "11".

Column 2, line 43, cancel the comma before the numeral "46" and insert a comma thereafter.

Column 3, line 23, cancel the parenthesis before "i.e."

Column 3, line 29, change "through" to -- thorough -- .

Signed and Sealed this

Twenty-ninth Day of September 1981

[SEAL]

Attest:

GERALD J. MOSSINGHOFF

Attesting Officer    Commissioner of Patents and Trademarks